United States Patent
Hsu et al.

(10) Patent No.: US 8,204,187 B2
(45) Date of Patent: Jun. 19, 2012

(54) PHONE DIALING METHOD

(75) Inventors: Tz-Ling Hsu, Taoyuan (TW); Kai-Feng Chiu, Bade (TW)

(73) Assignee: Foxconn Communication Technology Corp., Taoyuan County (TW)

( * ) Notice: Subject to any disclaimer, the term of this patent is extended or adjusted under 35 U.S.C. 154(b) by 1090 days.

(21) Appl. No.: 12/109,913

(22) Filed: Apr. 25, 2008

(65) Prior Publication Data

US 2009/0268888 A1    Oct. 29, 2009

(51) Int. Cl.
*H04M 11/00* (2006.01)
(52) U.S. Cl. ............. 379/93.23; 379/90.01; 379/201.01; 348/14.01
(58) Field of Classification Search ................ 379/93.23, 379/90.01, 201.01, 201.04; 455/414.2, 415, 455/564; 382/100, 115, 118, 181
See application file for complete search history.

(56) References Cited

U.S. PATENT DOCUMENTS

| 2007/0268309 A1* | 11/2007 | Tanigawa et al. ............. 345/619 |
| 2008/0144893 A1* | 6/2008 | Guo et al. ..................... 382/118 |

FOREIGN PATENT DOCUMENTS

| TW | 200516953 | 5/2005 |
| TW | I242351 | 10/2005 |

\* cited by examiner

*Primary Examiner* — Melur Ramakrishnaiah
(74) *Attorney, Agent, or Firm* — Altis Law Group, Inc.

(57) ABSTRACT

A phone dialing method is carried out on a communication device when browsing photos so as to make a phone call. First, a browser is activated to load a picture. Face features of all the existing human faces are detected. The face features of all contacts in a directory are compared to find out the contact matching the characters of human face. Then, the phone number of the contact is dialed. Further, after the picture is loaded, a user may set an identification area to narrow down the scope of identifying human faces. After that, the characters of human face of the selected human face are analyzed, and a search is made in the directory to find the contact matching the characters of human face. Finally, call contact by the number of directory.

13 Claims, 6 Drawing Sheets

PHONE DIALING METHOD

BACKGROUND OF THE INVENTION

1. Field of Invention

The present invention relates to a phone dialing method, and more particularly to a method performed by a communication device when browsing pictures so as to dial a phone number.

2. Related Art

With the development of wireless communication technology, people are not restricted to make a phone call at specific places by using mobile communication devices, such as mobile phones or personal digital assistants (PDAs) having communication function. Each mobile communication device uses a set of numbers as its communication codes (i.e., the number or phone number). When a user intends to use a mobile communication device to make a voice phone call with the user of another mobile communication device, he/she only has to input the communication codes of the other party to establish a voice call connection. However, due to the limited memory capability, the user cannot memorize the communication codes of all contacts. Therefore, currently, most communication devices have the function of a directory, such that the user can search the directory for the communication codes of a contact to make a voice phone call.

Besides the basic dialing function, the current mobile communication devices, for example, mobile phones, smart phones, and pocket PC phones are all provided with functions such as music playback, movie playback, video recording, photo shooting, and photo browsing, and web-page browsing. When a user intends to communicate with a person in the photo when browsing photos, the user must return to the directory to sequentially search for the communication codes (phone number), which is quite labor and time consuming. Some directories provide the function of quick search of communication codes through inputting the names of the person in the photo. However, the user may forget the name of the person in the photo. Further, some mobile communication devices have the function of voice dialing to establish a call connection by speaking the name of the contact, but the user is also required to think of the name of the contact. The directories of some other mobile communication devices provide the function of establishing the representative photos or graphics of the contact, such that the user may recall the name of the contact by viewing the corresponding photos or graphics of the contact. However, according to the method of searching the contact with photos, the user still has to sequentially search data in a directory. If a large quantity of data is recorded in the directory, it is still time-consuming to search for the communication codes of the person in the photo.

SUMMARY OF THE INVENTION

Accordingly, in order to overcome the disadvantage that it is time and labor consuming in searching a directory for a contact, the present invention is directed to a method of enabling a user to directly dial the phone number of a person in a photo when viewing the picture. All human faces in the photo are identified for the user to make a selection, and characters of human face features of the human faces are then analyzed to automatically search a directory for a corresponding contact, so as to dial the phone number of the contact. The present invention is also directed to a method of dialing the phone number of the contact by setting an identification area to reduce the time for identifying human faces and searching for the corresponding contact according to the characters of human face.

In order to achieve the above objectives, a phone dialing method is provided and includes the following steps. First, a browser is activated and a picture is loaded. Next, all human faces existing in the picture are detected. At least one characters of human face of selected human face is analyzed. Then, a search is made in a directory for finding a corresponding contact according to the characters of human face. Finally, call contact by the number of director.

In the phone dialing method according to a preferred embodiment of the present invention, the directory records data of plurality contacts. The contact profile consisting of names, phone numbers, human faces, and characters of human face. In addition, the face feature is selected from a group consisting of characters include the five sense organs, skins, hairs, and facial defects.

The phone dialing method according to a preferred embodiment of the present invention further includes a step of automatically adding a contact. First, it is determined that the directory has no contact matching the characters of human face. Then, a user window is generated for displaying a selected human face, and input profile of the contact. The human face and profile of the contact are stored into the directory.

The phone dialing method according to a preferred embodiment of the present invention further includes a step of calculating a characteristic vector according to the selected human face, and searching the directory for a corresponding contact according to the characteristic vector. (a) The corresponding characteristic vector is calculated with a center point of the selected human face as a reference according to sizes, colors, and positions of the face features of the human face. (b) The characteristic vector of each of the human faces in the directory is calculated with the Step (a). (c) A search is made in the directory for finding the contact matching the characteristic vector of the selected human face.

Further, in order to achieve the above objectives, another phone dialing method is provided and includes the following steps. First, an image browser is activated and a picture is loaded. Next, an identification area for user input is set. All human faces existing in the identification area are detected, and positions of the human faces are marked for the user to make selection. Then, analyze at least one characters of human face by selected human face. Finally, a search is made in a directory for finding a corresponding contact according to the characters of human face and call contact.

In view of the above, the present invention first identifies human faces in a picture, then calculates a characteristic vector of each of the human faces, and compares characteristic vectors of contacts in a directory with the characteristic vector of the selected human face in the picture, so as to find the corresponding contact, thereby call contact by number of the directory.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The objective and method of the present invention are described in detail below with preferred embodiments, and the concept of the present invention may also be applied to other scopes. The embodiments below are only used to illustrate the objective and method of the present invention, instead of limiting the scope of the same.

The First Embodiment

Figure 1:
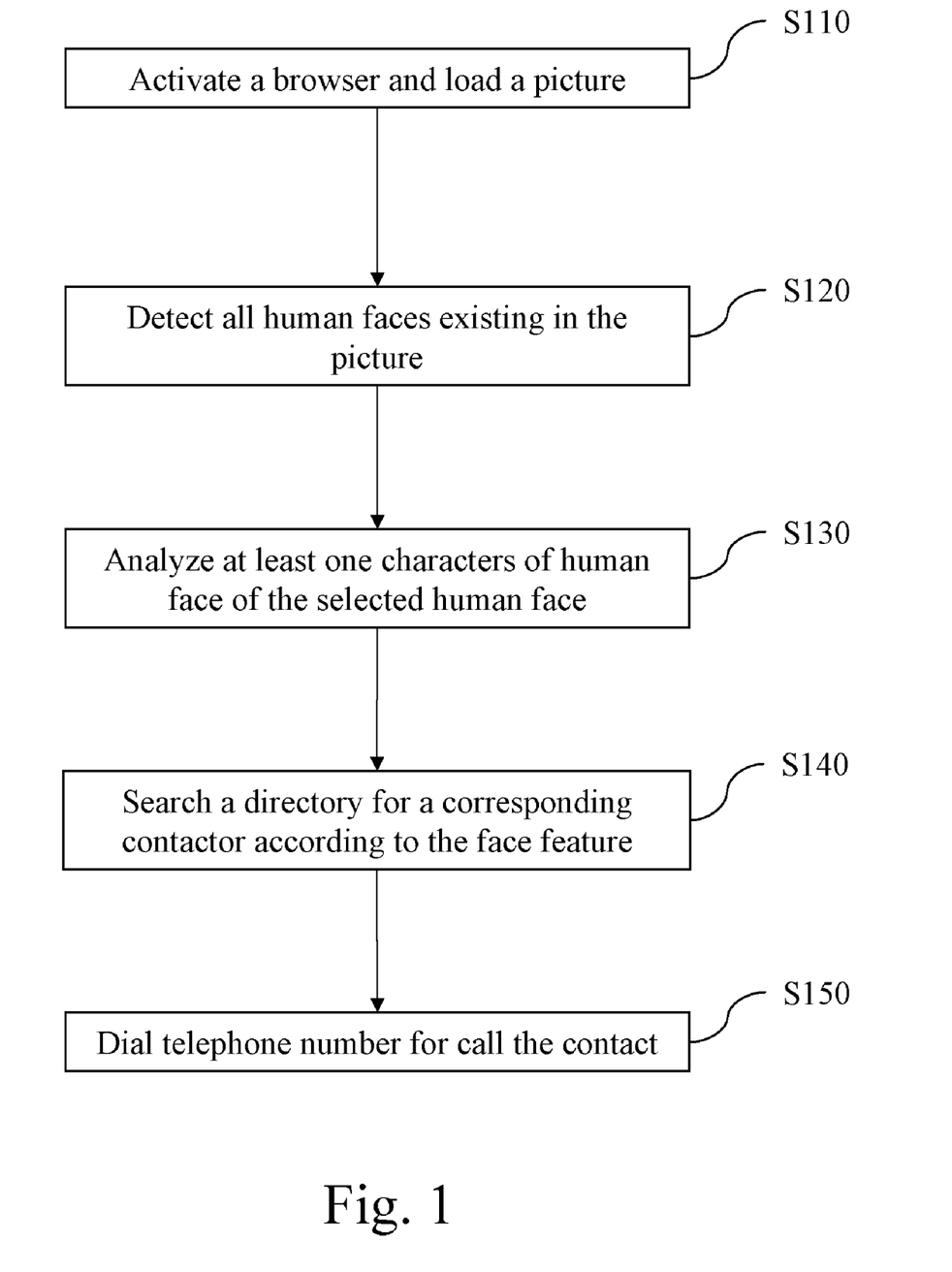
FIG. 1 is a flow chart of a phone dialing method according to a first embodiment of the present invention.

FIG. 1 is a flow chart of a phone dialing method according to a first embodiment of the present invention. Referring to FIG. 1, in the first embodiment, a communication device, for example, a mobile phone or a PDA, is adopted to perform the phone dialing method of the present invention when browsing photos. First, a browser is activated and a picture is loaded (Step S110). The user can directly view a photo shot by the communication device, or download the photo to the communication device and then activate a browser to browse the photo. Next, all human faces existing in the picture are detected (Step S120), and a microprocessor of the communication device executes a face identification program to identify all faces and positions thereof in the picture. In addition, the profiles and positions of the identified faces are marked. Afterwards, at least one face feature of the selected human face is analyzed (Step S130). Then, a search is made in a directory for finding a corresponding contact according to the face feature (Step S140). Finally, the phone number of the contact is dialed (Step S150).

The communication device has a built-in directory containing profile of a plurality of contacts. The profile of each contact includes, for example, name, phone number, human face, and characters of human face of the contact. The characters of human face may be characters of five sense organs, for example, the pupil color, nose shape, or distance between the five sense organs; or characters of the skin, for example, the skin color or the smoothness of the skin; or characters of the hair, for example, the color of the hair or the hair length; or even facial defect, for example, a scar. In the present invention, the face features of the human faces are first calculated and quantized, for calculating a characteristic vector of each human face. The above program is executed on the human face of each contact in the directory, and the obtained characteristic vectors are stored to form a characteristic vector database, used for searching the directory for the contact matching the characteristic vector.

The method of calculating a characteristic vector of a face includes the following steps, first, a skin color distribution graph of the face is created to quickly distinguish the back from the face. Next, the existence of the face is determined through fixed characters of the human face. For example, the upper portion of the human face is usually hair, and the middle-section generally shows eyes and a mouth. After that, a characteristic vector of the five sense organs of the face is calculated, for example, a feature triangle constituted by the pupil distance and the center of the forehead to the eyes, or a feature triangle constituted by the eyes to the center of the mouth, or the sizes of the eyes, mouth, eyebrows, etc. Thus, a vector is calculated to be used as the characteristic vector of each human face.

Generally speaking, the characteristic vectors of two different human faces are different. Accordingly, a characteristic vector of the face features of the photo (a photo representing the contact) set in the profile of each contact in the directory is calculated. When an unknown human face is input, the corresponding data of the contact is quickly found from the directory by comparing to the characteristic vector to see if the characteristic vector matches that of the contact.

Figure 2A:
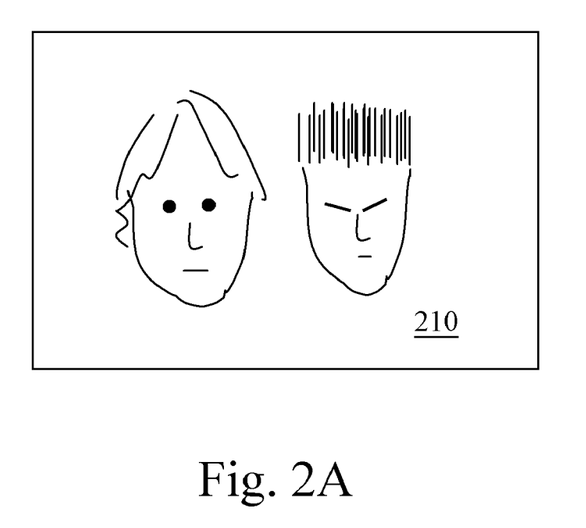
FIGS. 2A to 2D are schematic views showing the operation of dialing a phone according to the first embodiment of the present invention.
Figure 2B:
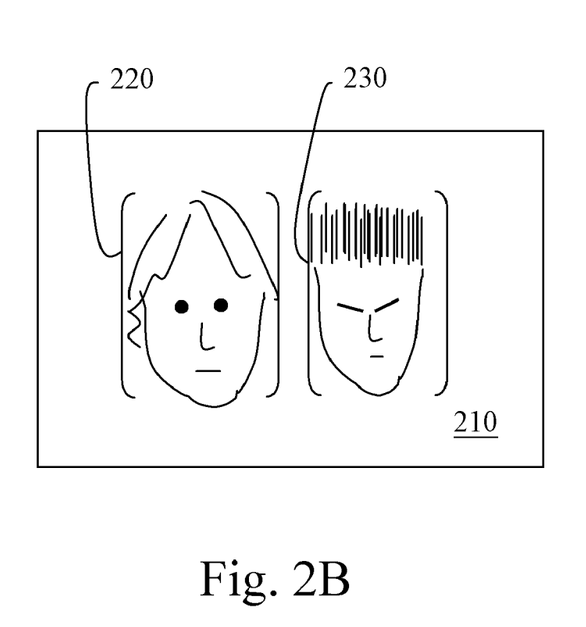

FIGS. 2A to 2D are schematic views showing the operation of dialing a phone according to the first embodiment of the present invention. A user operates a communication device to activate a browser to load a picture 210 as shown in FIG. 2A. Next, a microprocessor of the communication device detects all human faces existing in the picture, and marks the profiles and positions of the faces, for example, human faces 220, 230 as shown in FIG. 2B. At this time, the user may select the human face 220 by touching the screen or a key operation. After that, the microprocessor of the communication device further identifies face features of the human face 220, and calculates a characteristic vector according to the character of human face such as sizes, colors, and positions of the five sense organs (facial character). At this time, a preset face photo of each contact is taken from the directory and a characteristic vector of face features of each contact is calculated. In some embodiments, characteristic vectors of human faces of all contacts in the directory are first calculated to form a characteristic vector database. When the characteristic vector of a selected human face is analyzed, the identity of the contact in accordance with the selected human face may be quickly confirmed by comparing with the characteristic vector database.

Figure 2C:
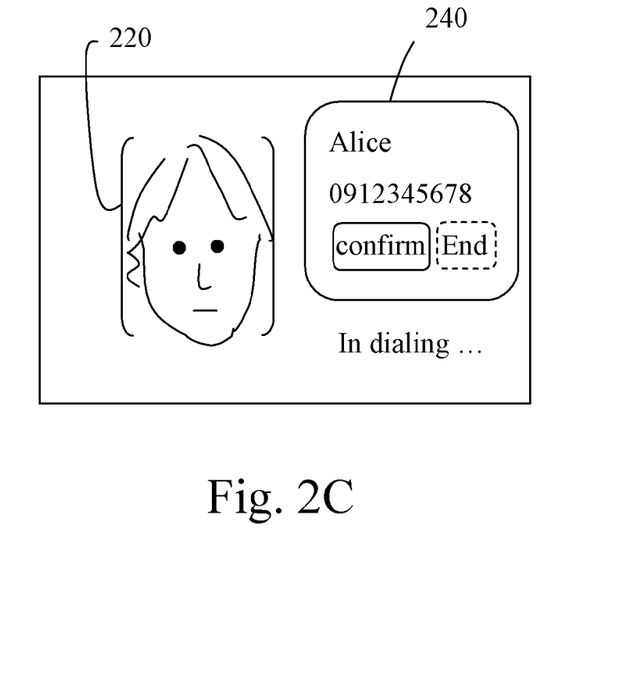
Figure 2D:
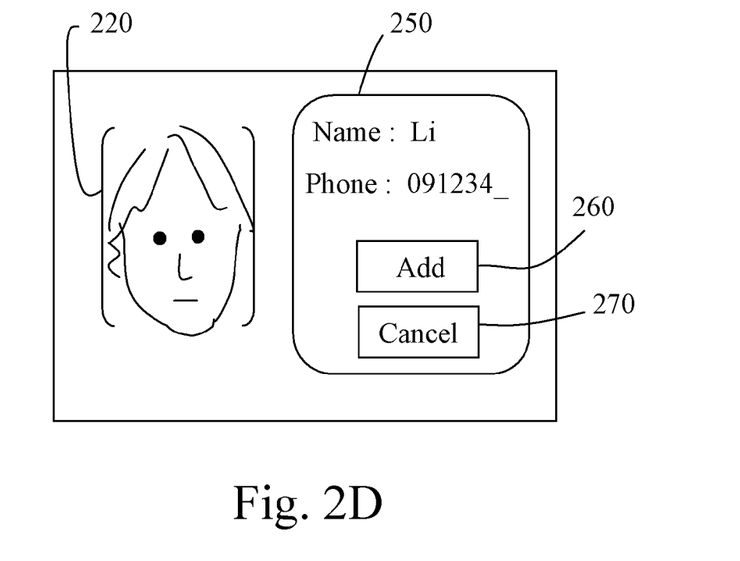

Next, referring to FIG. 2C, the communication device displays the human face 220 of the contact matching the characteristic vector in the directory on a screen, and also displays information such as name and phone number of the contact in a dialing confirmation window 240. When the user selects the "Confirm" option to make sure that the data of the contact is correct, the communication device dials the phone number of the searched contact. Afterwards, referring to FIG. 2D, if no matching contact can be found in the directory, than to add the contact. First, the selected human face 220 is displayed on the screen, and a contact adding interface 250 (i.e., a user interface displayed on the screen) is generated beside the human face 220 for inputting profile such as name and phone number of the contact. After the input, an "Add confirm" option 260 is selected to store the profile (such as the name, human face, and phone number of the contact) into the directory, or a "Cancel" 270 option is selected to terminate (or quit) this operation.

The Second Embodiment

Figure 3:
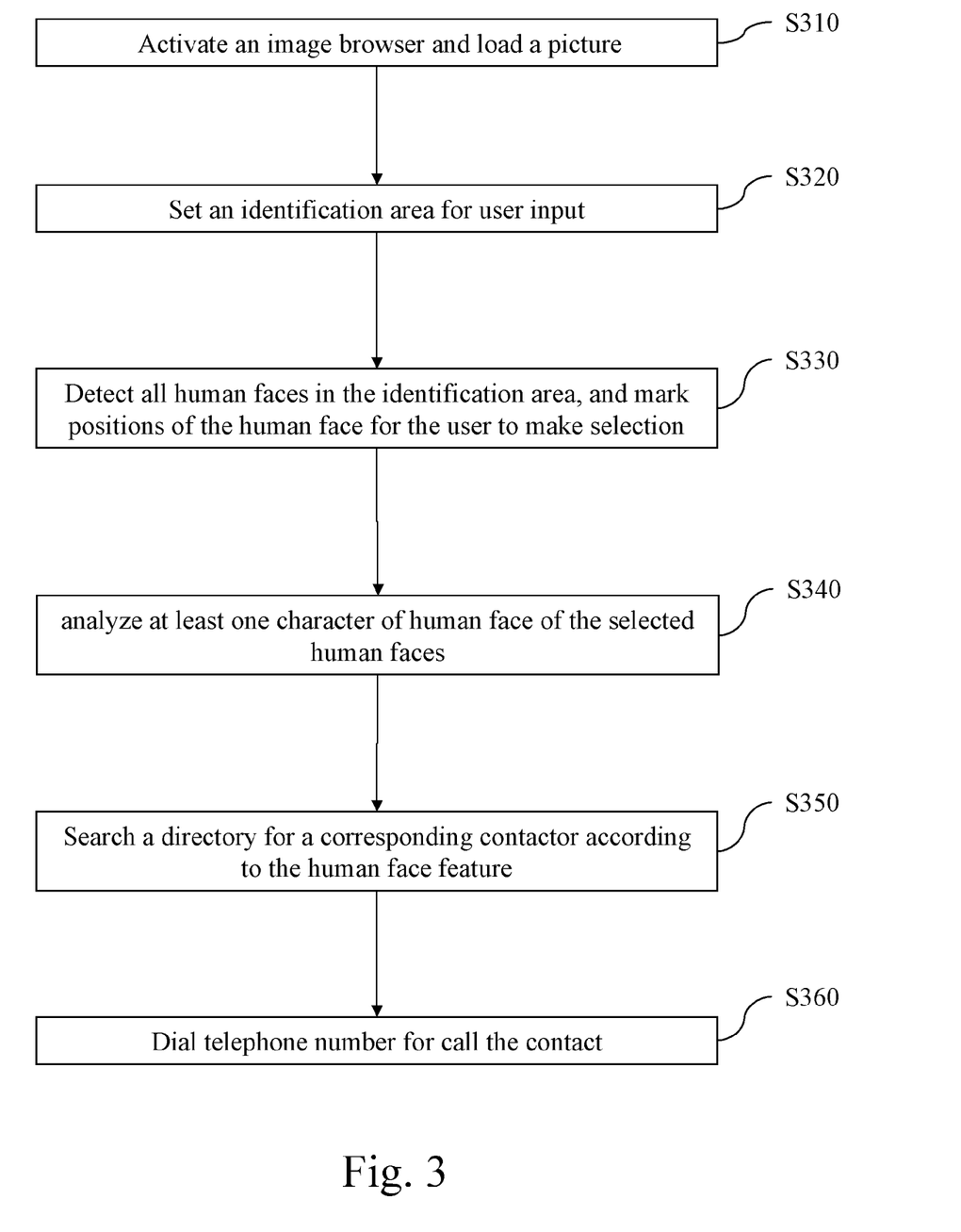
FIG. 3 is a flow chart of a phone dialing method according to a second embodiment of the present invention.

FIG. 3 is a flow chart of a phone dialing method according to a second embodiment of the present invention. Referring to FIG. 3, first, an image browser is activated and a picture is loaded (Step S310). Next, an identification area for user input is set (Step S320). Then, all human faces in the identification area are detected, and positions of the human faces are marked for the user to make selection (Step S330). After that, analyze at least one character of human face of the selected human faces (Step S340). The characters of human face which corresponding to the contact of directory (Step S350). Finally, call the contact (Step S360). The method of the second embodiment is similar to that of the first embodiment, and the main difference is described as follows. In the second embodiment, the user sets an identification area by touching the screen of the mobile device. Only the human faces inside the identification area are analyzed to respectively calculate a characteristic vector. As the mobile device only detects the human faces inside the identification area (determining whether the area contains a human face), the images out of the identification area will not be detected. Thus, the time for identifying whether a human face exists in an image is reduced. Moreover, only the facial images existing in the identification area need to be identified and compared (the human face out of the identification area will not be detected). Therefore, the setting of an identification area can effectively reduce the calculation for detecting a human face and identifying which contact matching the human face, and reduce the total time for dialing the phone number of the contact through an image.

Figure 4A:
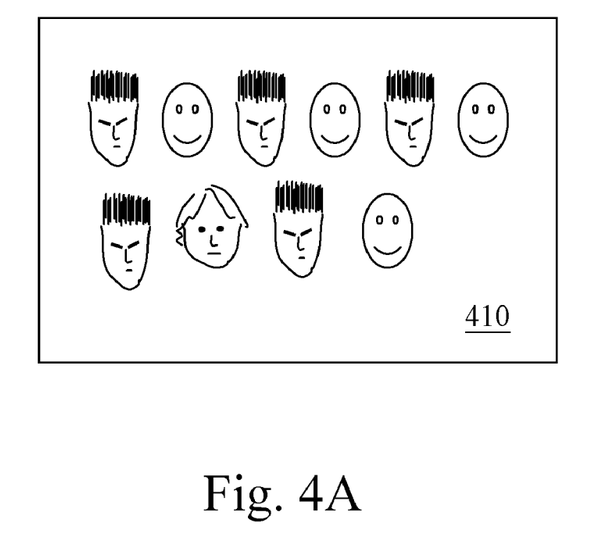
FIGS. 4A to 4D are schematic views showing the operation of dialing a phone according to the second embodiment of the present invention.
Figure 4B:
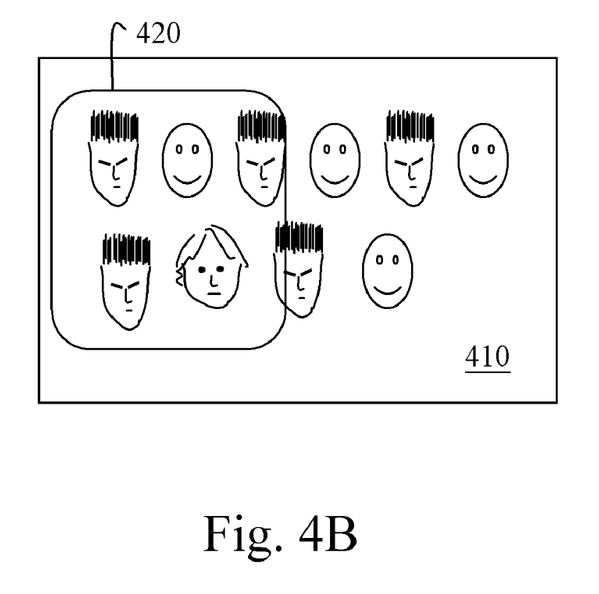
Figure 4C:
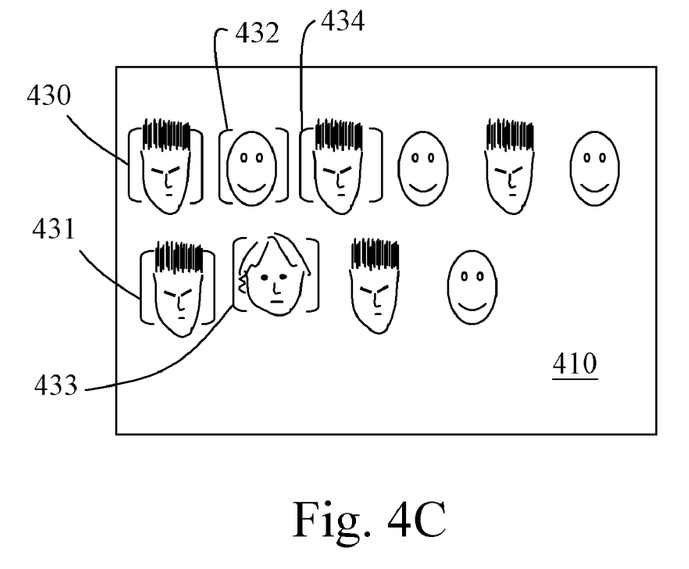
Figure 4D:
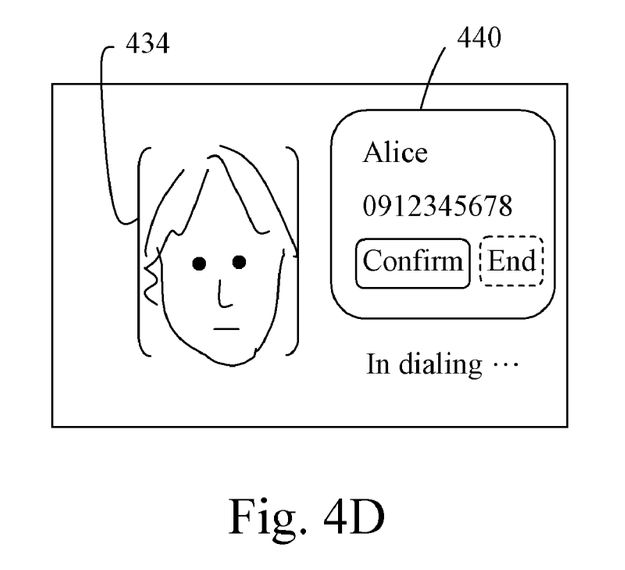

The second embodiment is then illustrated with an example. FIGS. 4A to 4D are schematic views showing the operation of dialing a phone according to the second embodiment of the present invention. First, a picture 410 as shown in FIG. 4A is loaded. Next, referring to FIG. 4B, the user sets (circles) an identification area 420 to be identified. After receiving the setting of the identification area 420, a communication device executes a human face identification program to find all human faces existing in the identification area 420, and mark positions/areas of the faces. Referring to FIG. 4C, in the picture 410, the communication device finds human faces 430-434 in the identification area set by the user, and marks the positions of the human faces. At this time, the user clicks the human face 434 to dial the phone number. After receiving the human face 434, the device analyzes character of human face 434, and calculates a characteristic vector of the character of human face. Then, a search is made in the characteristic vector database in the directory for finding a matching contact according to the characteristic vector. Next, referring to FIG. 4D, after the data of the corresponding contact is found, the human face 434 is displayed on a screen, and the profile of the contact is also shown in the dialing confirmation window 440. When the user selects the "Confirm" option in the dialing confirmation window 440, the phone number of the contact is dialed immediately. Similarly, if no matching contact is found in the directory, the program of adding a contact is executed. The steps of adding a contact is identical to those of the first embodiment, and the details will not be described herein again.

In view of the above, different from the manner of sequentially searching the directory for a contact, the present invention provides a more visualized communication interface. According to the phone dialing method of the present invention, when browsing a picture (or photo), the communication device automatically finds the persons in the photo. Moreover, the browser can directly select the human face in the photo to dial the phone number without terminating or leaving the browser.

What is claimed is:

1. A phone dialing method, performed by a communication device, wherein the communication device has a browser for browsing pictures, the method comprising:
    activating the browser and loading a picture;
    detecting all human faces existing in the picture;
    calculating a characteristic vector according to the selected human face and searching the directory for a corresponding contact according to the characteristic vector, the step comprising:
    (a) calculating the corresponding characteristic vector, with a center point of the selected human face as a reference according to sizes, colors, and positions of the characters of human face;
    (b) calculating the characteristic vector of each of the human face in the directory with the Step (a); and
    (c) searching the directory for the contactor matching the characteristic vector of the selected human face;
    analyzing at least one characters of human face of the selected human face;
    searching a corresponding contact from the directory according to the analyzed characters of human face; and
    calling the contact.

2. The phone dialing method as claimed in claim 1, wherein the directory records profile of a plurality of contacts, and the profile of the contacts is selected consisting of names, phone numbers, human faces, and characters of human face of the contacts.

3. The phone dialing method as claimed in claim 2, wherein the characters of human face in accordance with the data of each contact in the directory is selected consisting of characters of the five sense organs, skins, hairs, and facial defects.

4. The phone dialing method as claimed in claim 1, further comprising a step of automatically adding a contact, wherein the step comprises:
    determining that the directory has no contact matching the characters of human face;
    a user window is generated for displaying a selected human face for user adding contact profile; and
    storing the human face and the profile of the contact into the directory.

5. The phone dialing method as claimed in claim 1, further comprising a step of confirming that the data of the contact with a dialing confirmation window is correct before dialing the phone number.

6. The phone dialing method as claimed in claim 1, wherein the Step (b) further comprises storing the characteristic vector of each of the human faces to form a characteristic vector database, used for searching the directory for the contact matching the characteristic vector.

7. A phone dialing method, performed by a communication device, wherein the communication device has a browser for browsing pictures, the method comprising:
    activating an image browser and loading a picture;
    setting an identification area for user input;
    detecting all human faces existing in the identification area, and marking positions of the human face(s) for the user to make a selection;
    calculating a characteristic vector according to a selected human face(s) and searching the directory for a corresponding contact according to the characteristic vector;
    receiving the selected human face(s), and analyzing at least one face feature of the human face(s);
    the characters of human face which corresponding to the contact of directory; and
    calling the contact.

8. The phone dialing method as claimed in claim 7, wherein the directory records profile of contacts, and the profile of the contacts is selected consist of names, phone numbers, human faces, characters of human face, and character vectors of the contacts.

9. The phone dialing method as claimed in claim 8, wherein the characters of human face in accordance with the data of each contact in the directory is selected consisting of characters of the five sense organs, skins, hairs, and facial defects.

10. The phone dialing method as claimed in claim 7, further comprising a step of automatically adding a contact, wherein the step comprises:
    determining that the directory has no contact matching the characters of human face;

a user window is generated for displaying a selected human face for user adding contact profile; and storing the human face and the profile of the contact into the directory.

11. The phone dialing method as claimed in claim 7, wherein the step of calculating a characteristic vector according to the selected human face, and searching the directory for a corresponding contact according to the characteristic vector comprises:

(a) calculating the corresponding characteristic vector, with a center point of the selected human face as a reference according to sizes, colors, and positions of the face features of the human face;

(b) calculating the characteristic vector of each of the human faces in the directory with by the Step (a); and (c) searching the directory for the contactor matching the characteristic vector of the selected human face.

12. The phone dialing method as claimed in claim 11, further comprising a step of confirming that the data of the contact with a dialing confirmation window is correct before dialing the phone number.

13. The phone dialing method as claimed in claim 11, wherein the Step (b) further comprises storing the characteristic vector of each of the human faces to form a characteristic vector database, used for searching the directory for the contact matching the characteristic vector.

* * * * *